United States Patent
Wang et al.

(10) Patent No.: US 9,642,004 B2
(45) Date of Patent: May 2, 2017

(54) ACCESS POINT DEVICE AND SYSTEM FOR WIRELESS LOCAL AREA NETWORK, AND RELATED METHODS

(75) Inventors: Yue Wang, Beijing (CN); Hao Li, Beijing (CN); Dong Wang, Beijing (CN); Hiroshi Miyata, Tokyo (JP)

(73) Assignee: Yokogawa Electric Corporation, Musashino-Shi, Tokyo (JP)

( * ) Notice: Subject to any disclaimer, the term of this patent is extended or adjusted under 35 U.S.C. 154(b) by 47 days.

(21) Appl. No.: 14/130,821

(22) PCT Filed: Jun. 18, 2012

(86) PCT No.: PCT/CN2012/077075
§ 371 (c)(1),
(2), (4) Date: Feb. 26, 2014

(87) PCT Pub. No.: WO2013/004122
PCT Pub. Date: Jan. 10, 2013

(65) Prior Publication Data
US 2014/0226818 A1    Aug. 14, 2014

(30) Foreign Application Priority Data
Jul. 5, 2011  (CN) .......................... 2011 1 0191775

(51) Int. Cl.
*H04L 9/00* (2006.01)
*H04W 12/04* (2009.01)
(Continued)

(52) U.S. Cl.
CPC ............ *H04W 12/04* (2013.01); *H04L 9/083* (2013.01); *H04L 12/4641* (2013.01);
(Continued)

(58) Field of Classification Search
CPC .... H04W 12/04; H04L 9/083; H04L 12/4641; H04L 63/065
See application file for complete search history.

(56) References Cited

U.S. PATENT DOCUMENTS 5,199,072 A * 3/1993 White et al. .................... 380/44
6,307,837 B1 * 10/2001 Ichikawa et al. ............. 370/230
(Continued)

FOREIGN PATENT DOCUMENTS

EP    1876761 A1    1/2008

OTHER PUBLICATIONS

Communication dated Mar. 23, 2015 from the European Patent Office in counterpart application No. 12807462.2.
(Continued)

*Primary Examiner* — Taghi Arani
*Assistant Examiner* — Sharon Lynch
(74) *Attorney, Agent, or Firm* — Sughrue Mion, PLLC

(57) ABSTRACT

The present invention provides an access point device and system for a wireless local area network, and related methods thereof. On the access point device, a same ESS is divided into a plurality of VLANs, wherein the access point device comprises a broadcast key management module which is used for managing broadcast keys encrypting broadcast information and a broadcast key storage device which is used for storing the broadcast keys. The broadcast keys are stored in the broadcast key storage device in a way of corresponding to VLAN IDs of the VLANs, and the broadcast key management module can obtain the corresponding broadcast keys through the VLAN IDs.

10 Claims, 6 Drawing Sheets

(51) Int. Cl.
*H04L 9/08* (2006.01)
*H04L 12/46* (2006.01)
*H04L 29/06* (2006.01)
*H04W 88/08* (2009.01)

(52) U.S. Cl.
CPC ...... *H04L 63/065* (2013.01); *H04L 2209/601* (2013.01); *H04L 2209/80* (2013.01); *H04W 88/08* (2013.01)

(56) References Cited

U.S. PATENT DOCUMENTS

| | | | | |
|---|---|---|---|---|
| 6,487,657 | B1* | 11/2002 | Brockmann | 713/154 |
| 6,950,628 | B1* | 9/2005 | Meier et al. | 455/41.2 |
| 7,194,622 | B1 | 3/2007 | Halasz et al. | |
| 7,350,077 | B2* | 3/2008 | Meier et al. | 713/171 |
| 7,703,132 | B2* | 4/2010 | Volpano et al. | 726/15 |
| 7,944,925 | B2* | 5/2011 | Meier et al. | 370/395.1 |
| 8,161,278 | B2* | 4/2012 | Harkins | 713/155 |
| 8,280,058 | B2* | 10/2012 | Conway et al. | 380/270 |
| 8,503,442 | B2* | 8/2013 | Miyoshi | G06F 15/177 370/389 |
| 8,611,270 | B1* | 12/2013 | Sapkota | H04W 4/06 370/312 |
| 8,966,611 | B2 | 2/2015 | Volpano | 726/15 |
| 2003/0099362 | A1* | 5/2003 | Rollins | 380/278 |
| 2003/0152235 | A1* | 8/2003 | Cohen et al. | 380/278 |
| 2003/0219129 | A1* | 11/2003 | Whelan et al. | 380/270 |
| 2004/0078566 | A1* | 4/2004 | Barber et al. | 713/161 |
| 2004/0103282 | A1* | 5/2004 | Meier et al. | 713/171 |
| 2004/0221042 | A1* | 11/2004 | Meier | 709/227 |
| 2005/0025160 | A1* | 2/2005 | Meier et al. | 370/395.53 |
| 2005/0050318 | A1* | 3/2005 | Alone et al. | 713/155 |
| 2005/0185626 | A1* | 8/2005 | Meier et al. | 370/338 |
| 2005/0220054 | A1* | 10/2005 | Meier et al. | 370/331 |
| 2005/0223111 | A1* | 10/2005 | Bhandaru et al. | 709/236 |
| 2006/0078124 | A1* | 4/2006 | Whelan et al. | 380/273 |
| 2006/0133614 | A1* | 6/2006 | Zhang et al. | 380/273 |
| 2006/0248227 | A1* | 11/2006 | Hato et al. | 709/245 |
| 2007/0183599 | A1* | 8/2007 | Cohen et al. | 380/278 |
| 2007/0195725 | A1* | 8/2007 | Iino et al. | 370/328 |
| 2007/0204158 | A1* | 8/2007 | Hatashita et al. | 713/171 |
| 2007/0286108 | A1* | 12/2007 | Meier et al. | 370/312 |
| 2007/0288997 | A1* | 12/2007 | Meier et al. | 726/4 |
| 2008/0025321 | A1* | 1/2008 | Gudipudi | H04W 16/00 370/395.53 |
| 2009/0034736 | A1* | 2/2009 | French | 380/278 |
| 2009/0129386 | A1* | 5/2009 | Rune | H04L 12/2881 370/392 |
| 2009/0262718 | A1* | 10/2009 | Meier et al. | 370/338 |
| 2009/0262740 | A1* | 10/2009 | Miyoshi | G06F 15/177 370/392 |
| 2011/0126278 | A1* | 5/2011 | Volpano | 726/15 |
| 2012/0008528 | A1* | 1/2012 | Dunbar | H04L 12/462 370/255 |
| 2012/0166804 | A1* | 6/2012 | Nambiar | 713/171 |
| 2013/0024692 | A1* | 1/2013 | Volpano | 713/169 |
| 2013/0201979 | A1* | 8/2013 | Iyer et al. | 370/338 |
| 2013/0305332 | A1* | 11/2013 | Narasimhan et al. | 726/7 |
| 2016/0036620 | A1* | 2/2016 | Dunbar | H04L 12/4625 370/338 |

OTHER PUBLICATIONS

International Search Report for PCT/CN2012/077075 dated Sep. 13, 2012.

* cited by examiner

US 9,642,004 B2

ACCESS POINT DEVICE AND SYSTEM FOR WIRELESS LOCAL AREA NETWORK, AND RELATED METHODS

CROSS REFERENCE TO RELATED APPLICATIONS

This application is a National Stage of International Application No. PCT/CN2012/077075, filed on Jun. 18, 2012, which claims priority from Chinese Patent Application No. 201110191775.8, filed on Jul. 5, 2011, the contents of all of which are incorporated herein by reference in their entirety.

FIELD OF THE INVENTION

The present invention relates to the field of wireless communication technology, and particularly, to an access point device for a wireless local area network, a wireless local area network system, a method for broadcasting encrypted information in a wireless local area network and a method for updating broadcast keys.

BACKGROUND OF THE INVENTION

A wireless local area network (WLAN) has been increasingly applied in various working environments. Under certain situations, one WLAN needs to be divided into a plurality of virtual local area networks (VLANs). In the prior art, virtual access point (or logic access point) devices are established in one physical access point device, and then the VLANs are divided through extended service sets (ESSs), such that each VLAN corresponds to one ESS. For example, as shown in FIG. 1, two virtual access point devices AP1_a and AP1_b, as well as AP2_a and AP2_b are established in two physical access point devices AP1 and AP2, respectively, the AP1_a and the AP1_b constitute a wireless distributed system (WDS) and share a unique ESS identifier (ID) SSID1, and the AP2_a and the AP2_b constitute another WDS and share a unique ESS ID SSID2.

In an existing system (as shown in FIG. 2), as one ESS only corresponds to one VLAN, if a wireless device is switched from one VLAN to another VLAN, the connection with the ESS corresponding to the original VLAN has to be disconnected, and then the wireless device is re-associated to the ESS corresponding to the new VLAN. Meanwhile, as an independent safety strategy can be designated for each ESS, in a range covered by each ESS, a particular broadcast key for the ESS can be used to encrypt broadcast information.

As a strategy on which ESS the wireless device selects is not regulated in the prior art, the switching of the wireless device in the WLAN from one VLAN to another VLAN becomes an autonomous behavior of a client, that is, this behavior is not controlled by an external system. In the example shown in FIG. 2, if the wireless device disconnects its connection with the VLAN1 (ESS1) through an authentication, the device may still try to associate with the VLAN1 (ESS1), and even if the association is failed, the device may continuously try, such that a large amount of invalid garbage data is generated to cause additional cost to the VLAN1 (ESS1).

However, in a wired VLAN environment (as shown in FIG. 3), a device accesses the network through a switch, and after being authenticated by a back-end authentication system, the device is then switched from one VLAN to another VLAN by the switch (for example, switched from a default VLAN1 to the VLAN2 to which the device belongs). During the whole switching process, the device accessing the network may not realize that it has been switched from one VLAN to another VLAN, that is, this behavior can be controlled by an external system, and network cables do not need to be unplugged during the switching process for re-connection (i.e., the original connection does not need to be disconnected).

SUMMARY OF THE INVENTION

In order to realize access control which is similar to that in a wired VLAN environment in a wireless VLAN environment, the present invention provides a wireless communication network structure in which one ESS is divided into a plurality of VLANs, such that when a wireless device is switched from one VLAN to another VLAN, its connection with the ESS does not need to be disconnected. However, if in this wireless communication network structure, an original broadcast information encryption way (i.e., a particular broadcast key for the ESS is used to encrypt broadcast information) is still adopted to encrypt the broadcast information sent to the same ESS, effective information isolation cannot be performed among the plurality of VLANs corresponding to the one ESS.

In order to solve the problem of performing effective information isolation on the plurality of the VLANs, the present invention provides a method for broadcasting encrypted information. Broadcast keys (GTK or broadcast keys) for encrypting broadcast information are indexed through VLAN IDs so as to realize information isolation among the plurality of VLANs.

According to one aspect of the present invention, an access point device for a wireless local area network is provided, on the access point device, a same ESS is divided into a plurality of VLANs, wherein the access point device comprises a broadcast key management module which is used for managing broadcast keys encrypting broadcast information; and a broadcast key storage device which is used for storing the broadcast keys, wherein the broadcast keys are stored in the broadcast key storage device in a way of corresponding to VLAN IDs of the VLANs, and the broadcast key management module obtains corresponding broadcast keys through the VLAN IDs.

By utilizing the above access point device, the broadcast keys are stored in the broadcast key storage device in the way of corresponding to the VLAN IDs, that is, a respective broadcast key is stored for each VLAN, and therefore, selecting a different broadcast key for each VLAN to encrypt the broadcast information sent to this VLAN can be realized, and thus the information isolation among the plurality of the VLANs is realized.

According to another aspect of the present invention, a wireless local area network system is provided, and the wireless local area network system comprises the access point device according to the present invention.

Through the above wireless local area network system, due to the adoption of the access point device according to the present invention, selecting a different broadcast key for each VLAN to encrypt the broadcast information sent to this VLAN can be realized, and thus the information isolation among the plurality of the VLANs is realized.

According to another aspect of the present invention, a method for broadcasting encrypted information in a wireless local area network is provided, on an access point device of the wireless local area network, a same ESS is divided into a plurality of VLANs, wherein the method includes the following steps: issuing a broadcast key; encrypting information, in which a broadcast key corresponding to a VLAN ID of a VLAN is utilized to encrypt information broadcast to the VLAN; and broadcasting the encrypted information, in which the encrypted information is broadcasted, wherein the step of issuing a broadcast key includes the following sub-steps: acquiring a wireless device ID of a wireless device accessing the wireless local area network; acquiring a VLAN ID of a VLAN to which the wireless device belong through the acquired wireless device ID; acquiring a corresponding broadcast key through the acquired VLAN ID; and issuing the acquired broadcast key to the wireless device.

By utilizing the above method for broadcasting encrypted information, as for the wireless device ID of each wireless device, the VLAN ID of the VLAN to which this device belongs is acquired, the broadcast key corresponding to this VLAN ID is further acquired, and the acquired broadcast keys are issued to the corresponding wireless device, so that each wireless device may have the broadcast key corresponding to the VLAN to which the wireless device belongs. After a wireless device receives encrypted broadcast information, if the broadcast key for encrypting the broadcast information is consistent with the broadcast key owned by this wireless device, the wireless devices can utilize its broadcast key to decrypt the encrypted broadcast information and thus acquire the broadcast information; if the broadcast key for encrypting the broadcast information is inconsistent with the broadcast key owned by this wireless device, the wireless device cannot utilize its broadcast key to decrypt the encrypted broadcast information and thus cannot acquire the broadcast information and discard the broadcast information. Therefore, broadcasting encrypted information for a VLAN may be realized, only a wireless device which belongs to this VLAN can utilize the broadcast key to decrypt the encrypted broadcast information, so that the information isolation among the plurality of the VLANs is realized.

According to another aspect of the present invention, a method for updating broadcast keys in a wireless local area network is provided, on an access point device of the wireless local area network, a same ESS is divided into a plurality of VLANs, wherein the method includes the following steps: acquiring a VLAN ID of a VLAN whose broadcast key needs to be updated; acquiring a corresponding to-be-updated broadcast key through the acquired VLAN ID; and issuing the acquired to-be-updated broadcast key to all wireless devices accessing the VLAN, and then broadcasting encrypted information utilizing the updated broadcast key.

By utilizing the above method for updating broadcast keys, as for the VLAN ID of a VLAN, the to-be-updated broadcast key corresponding to this VLAN ID is acquired, and the acquired to-be-updated broadcast key is issued to all wireless devices belonging to this VLAN, so that updating broadcast keys in unit of VLAN is realized. Only when a wireless device belongs to this VLAN, the wireless device can receive the updated broadcast key for the VLAN, so that the information isolation among the plurality of the VLANs is realized.

Different broadcast keys are provided for different VLANs, which may realize the information isolation among the plurality of the VLANs. Meanwhile, as the same ESS is divided into the plurality of the VLANs, when a wireless device is switched from one VLAN to another VLAN, its connection with the ESS does not need to be disconnected, such that the access control which is similar to that in the wired VLAN environment is realized. During the whole switching process, a wireless device accessing the WLAN may not realize that it has been switched from one VLAN to another VLAN, that is, this behavior may be controlled by an external system.

The following parts of the description will describe various aspects of the present invention, and the detailed description is used for fully disclosing the preferred embodiments of the present invention rather than limiting the present invention.

BRIEF DESCRIPTION OF THE DRAWINGS

The present invention will be better understood with reference to the drawings which are only used for the purpose of description, wherein FIG. 1 exemplarily illustrates one way of dividing VLANs in a WLAN.

DETAILED DESCRIPTION OF THE EMBODIMENTS

Various embodiments of the present invention will be described below in detail in conjunction with the accompanying drawings, but it should be recognized that the various embodiments are only used as examples for the purpose of description instead of limiting the scope of the present invention. The person skilled in the art can make various modifications and/or variations according to the teachings of the present invention without departing from the spirit of the present invention. The protection scope of the present invention intends to cover all these modifications and/or variations.

Figure 1:
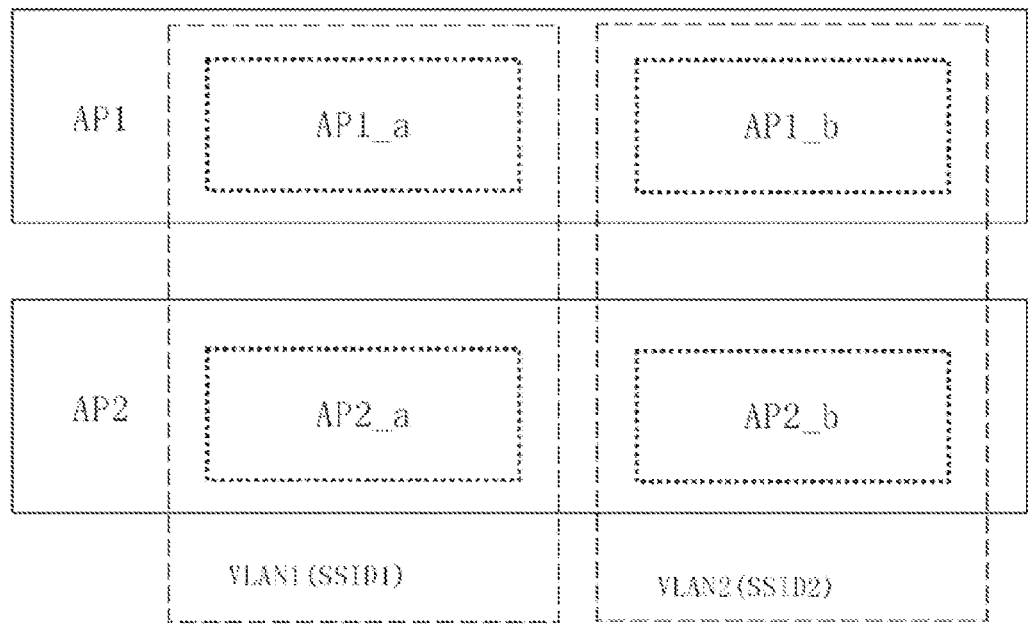
Figure 2:
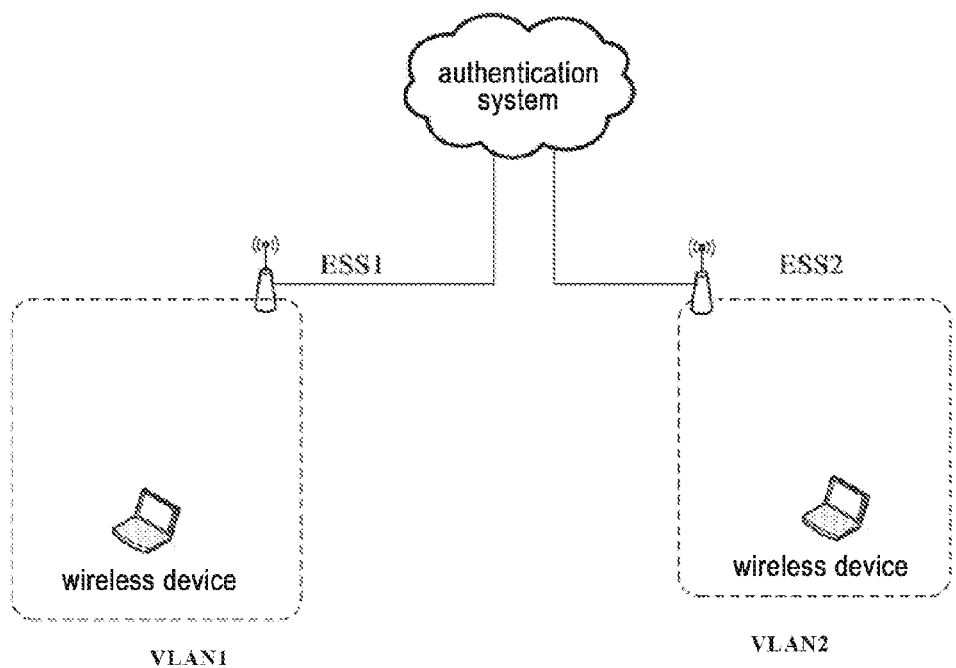
FIG. 2 illustrates a way of dividing VLANs according to that ESSs and VLANs are in one-to-one correspondence in the prior art.
Figure 3:
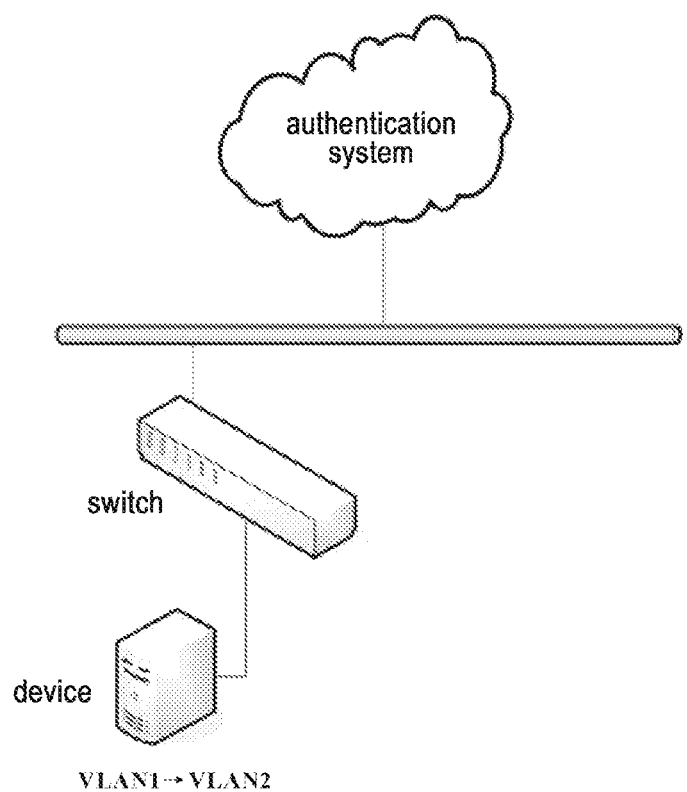
FIG. 3 is a schematic diagram illustrating that a device is switched from one VLAN to another VLAN in a wired VLAN environment.
Figure 4:
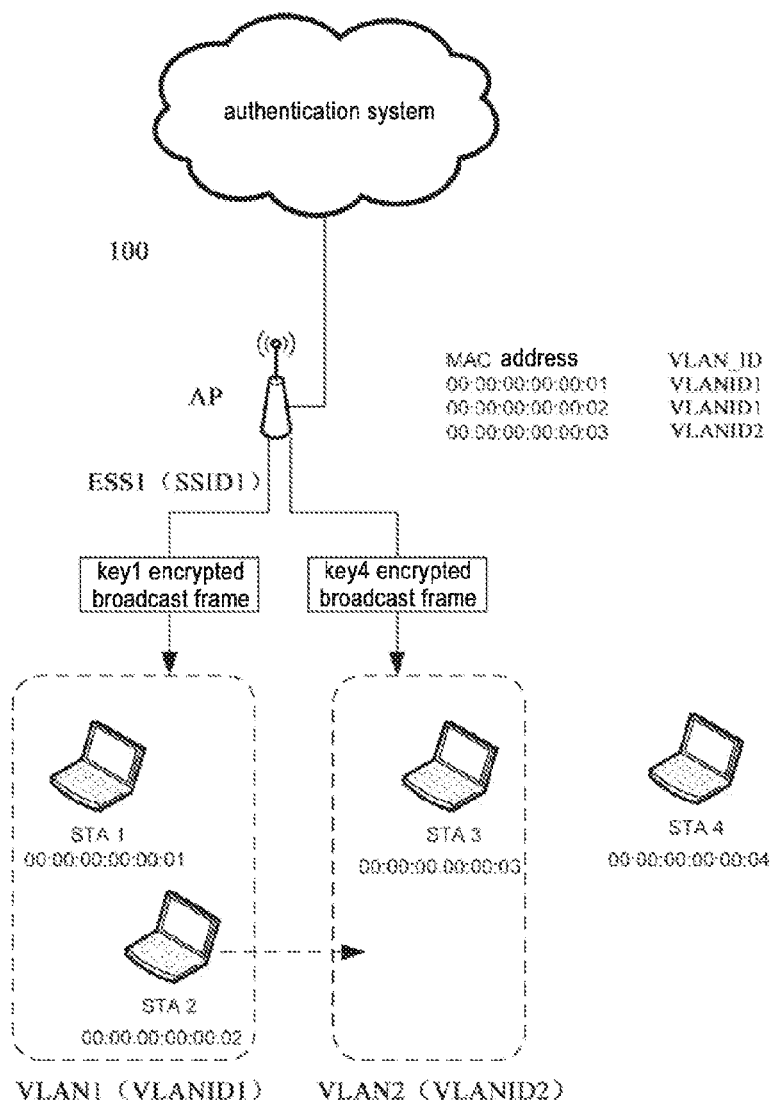
FIG. 4 illustrates an example of a WLAN system according to an embodiment of the present invention.

FIG. 4 illustrates an example of WLAN system 100 according to an embodiment of the present invention. The WLAN system 100 comprises an access point device AP, and an ESS ESS1 with an ESS ID SSID1 is provided on the access point device AP. The ESS ESS1 is divided into two VLANs VLAN1 and VLAN2, having VLAN IDs VLANID1 and VLANID2, respectively. In the example shown in FIG. 4, there are four wireless devices STA1-STA4, and each wireless device has a respective wireless device ID. In this embodiment, respective media access control (MAC) addresses of the wireless devices serve as the wireless devices IDs. As shown in FIG. 4, the MAC addresses of the wireless devices STA1-STA4 are 00:00:00:00:00:01, 00:00:00:00:00:02, 00:00:00:00:00:03 and 00:00:00:00:00:04, respectively.

In the example shown in FIG. 4, the wireless devices STA1 and STA2 access the VLAN1, the wireless device STA3 accesses the VLAN2, and the wireless device STA4 has no access to any VLAN. When the access point device AP respectively performs encrypted broadcast to the VLAN1 and the VLAN2, broadcast keys corresponding to respective VLANs are selected to encrypt broadcast information to be sent to the VLANs so as to realize information isolation among respective VLANs. In the example shown in FIG. 4, the access point device AP selects key1 for the VLAN1 to encrypt the broadcast information to be sent to the VLAN1, and selects key4 for the VLAN2 to encrypt the broadcast information to be sent to the VLAN2 so as to realize the information isolation between the VLAN1 and the VLAN2.

FIG. 4 further shows an authentication system connected to the WLAN system 100, after a wireless device accesses the WLAN system 100, the accessed wireless device is authenticated through the authentication system, and after authentication, if the wireless device is found to belong to a particular VLAN, the wireless device may be automatically switched to the VLAN. During the whole switching process, the wireless device accessing the WLAN may not realize that it has been switched from one VLAN to another VLAN, that is, this behavior may be controlled by an external system, and the connection with the ESS ESS1 does not need to be disconnected during the switching process (that is, the original connection does not need to be disconnected). Therefore, access control which is similar to that in a wired VLAN environment is realized in a wireless VLAN environment.

Alternatively or additionally, corresponding relationship between wireless device IDs of wireless devices and VLAN IDs of VLANs may be maintained in the access point device AP. For example, the corresponding relationship between the MAC addresses (the wireless device IDs) and the VLAN IDs are shown in FIG. 4. When a wireless device accesses the WLAN, the access point device AP acquires the corresponding VLAN ID through the wireless device ID of the wireless device and automatically switches the wireless device to the VLAN. During the whole switching process, the wireless device accessing the WLAN may not realize that it has been switched from one VLAN to another VLAN, that is, this behavior may be controlled by the external system, and the connection with the ESS ESS1 does not need to be disconnected during the switching process (that is, the original connection does not need to be disconnected). Therefore, access control which is similar to that in a wired VLAN environment can be realized in a wireless VLAN environment.

Figure 5:
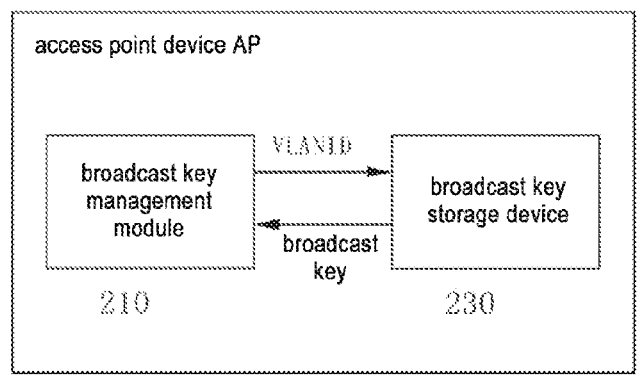
FIG. 5 is a schematic block diagram of an access point device in the WLAN system illustrated in FIG. 4.

FIG. 5 is a schematic block diagram of the access point device AP in the WLAN system 100 shown in FIG. 4. The access point device AP comprises a broadcast key management module 210 which is used for managing broadcast keys encrypting broadcast information and a broadcast key storage device 230 which is used for storing the broadcast keys. In the broadcast key storage device 230, the broadcast keys are stored in a way of corresponding to the VLAN IDs. The broadcast key management module 210 can obtain the corresponding broadcast keys through the VLAN IDs.

By utilizing the access point device AP, the broadcast keys are stored in the broadcast key storage device 230 in the way of corresponding to the VLAN IDs, that is, a respective broadcast key is stored for each VLAN. The broadcast key management module 210 utilizes a VLAN ID of a VLAN to search for the broadcast key corresponding to the VLAN ID in the broadcast key storage device 230, and then the access point device AP utilizes the found broadcast key to encrypt the broadcast information sent to the corresponding VLAN so as to realize the information isolation among the plurality of the VLANs.

Figure 6:
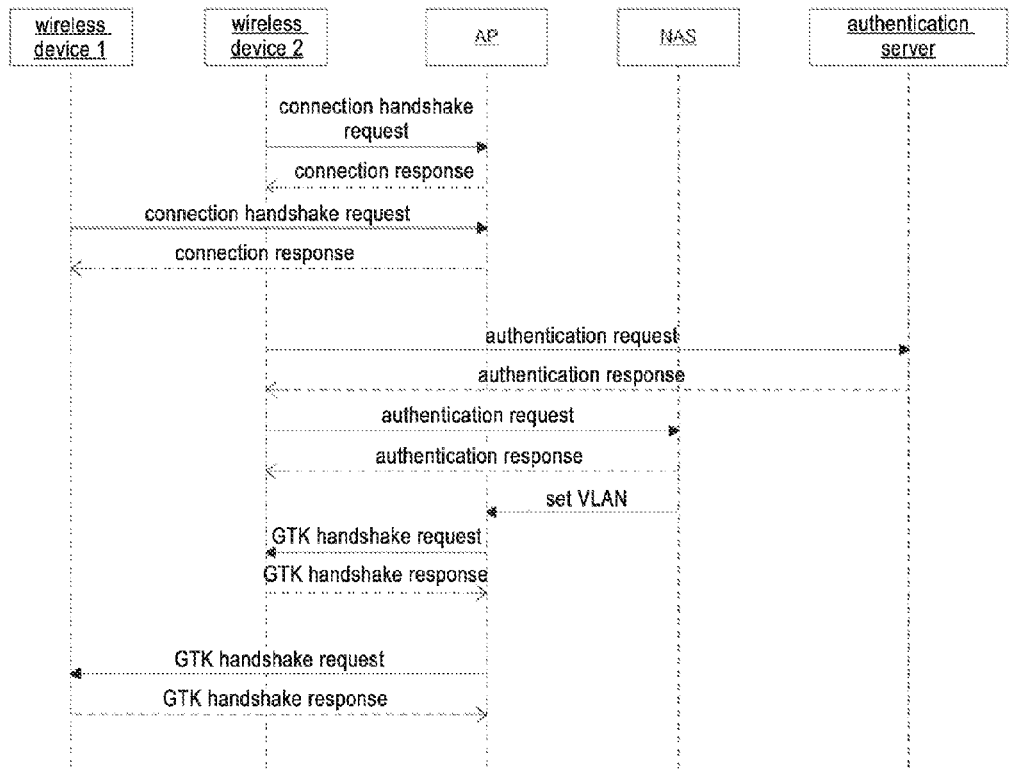
FIG. 6 is a flow diagram exemplarily illustrating performing authentication on wireless devices accessing a WLAN, performing isolation through VLANs and updating broadcast keys according to an embodiment of the present invention.

FIG. 6 is a flow diagram exemplarily illustrating performing authentication on wireless devices accessing a WLAN, performing isolation through VLANs and updating broadcast keys according to an embodiment of the present invention.

As shown in FIG. 6, a wireless device 1 and a wireless device 2 send connection handshake requests to the access point device AP, the access point device AP respectively responds to the connection handshake requests of the wireless devices 1 and 2, the wireless devices 1 and 2 are added into a default VLAN (for example, VLAN1) (for example, enabling the wireless device IDs of the wireless devices 1 and 2 to correspond to the VLAN ID of the VLAN1), and the broadcast key of the VLAN1 (the default VLAN) is issued to the wireless devices 1 and 2. Therefore, the wireless devices 1 and 2 may utilize the broadcast key of the VLAN1 to decrypt encrypted broadcast for VLAN1 and obtain the broadcast information.

The wireless device 2 sends an authentication request to an authentication server, and the authentication server responds to the authentication request. The wireless device 2 passes the authentication, and the authentication server grants an encryption key for accessing control to the wireless device 2. The wireless device 2 applies to a network access control server (NAS) for access control authorization utilizing the encryption key for accessing control. The trust relationship between the authentication server and the NAS is established in advance, and the authentication server sets a decryption key on the NAS in advance. If a wireless device applies to the NAS for access control using an encrypted request messages and the NAS can correctly decrypt, the wireless device is considered to pass the authentication and can be authorized. After the NAS performs access control authorization on the wireless device 2 (for example, the wireless device 2 is authorized to access the VLAN2), the NAS instructs the access point device AP to set the VLAN accessed by the wireless device 2 through a simple network management protocol (SNMP) command (the process will be described later in detail through FIG. 10). Upon receipt of the instruction from the NAS, the access point device AP sets the VLAN to which the wireless device 2 belongs (for example, enabling the wireless device ID of the wireless device 2 to correspond to the VLAN ID of the VLAN2). The access point device AP sends a command to issue the broadcast key of the VLAN2 to the wireless device 2. Therefore, the wireless device 2 may utilize the broadcast key of the VLAN2 to decrypt encrypted broadcast for the VLAN2 and obtain the broadcast information.

When a wireless device leaves its original VLAN with a broadcast key, the broadcast key held by other devices in the VLAN are not safe any more and the broadcast key is necessary to be updated. Therefore, as the wireless device 2 leaves from the original VLAN1, in order to disable the wireless device 2 from decrypting the encrypted broadcast for the VLAN1 using the broadcast key of the VLAN1 any more, the broadcast key of the VLAN1 needs to be updated. The access point device AP issues an updated broadcast key of the VLAN1 to all wireless devices accessing the VLAN1, and then utilizes the updated broadcast key to encrypt the broadcast information of the VLAN1. Different broadcast keys are used for different VLANs; and furthermore, after one wireless device is cut off from a certain VLAN, the broadcast key of the VLAN is updated, so that the broadcast key of the VLAN is prevented from leaking.

Alternatively or additionally, in the above case, whether the broadcast key needs to be updated is a configurable option for a user. Under certain occasions, the user thinks that it doesn't matter even if the broadcast key is leaked, and the broadcast key does not need to be updated. For example, the default VLAN in the WLAN is a network which can be accessed by any wireless device, and even if its broadcast key is leaked, the safety may not be affected.

Figure 7:
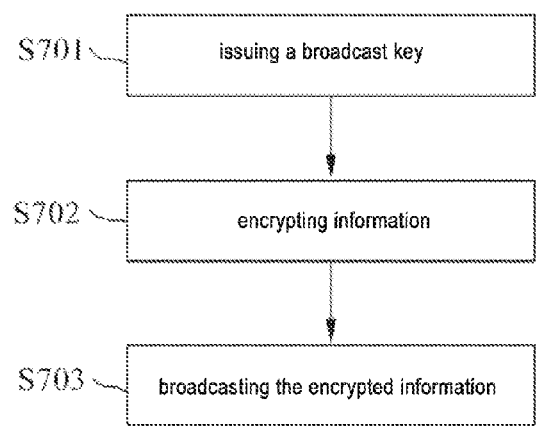
FIG. 7 is a flow diagram of a method for broadcasting encrypted information according to an embodiment of the present invention.
Figure 8:
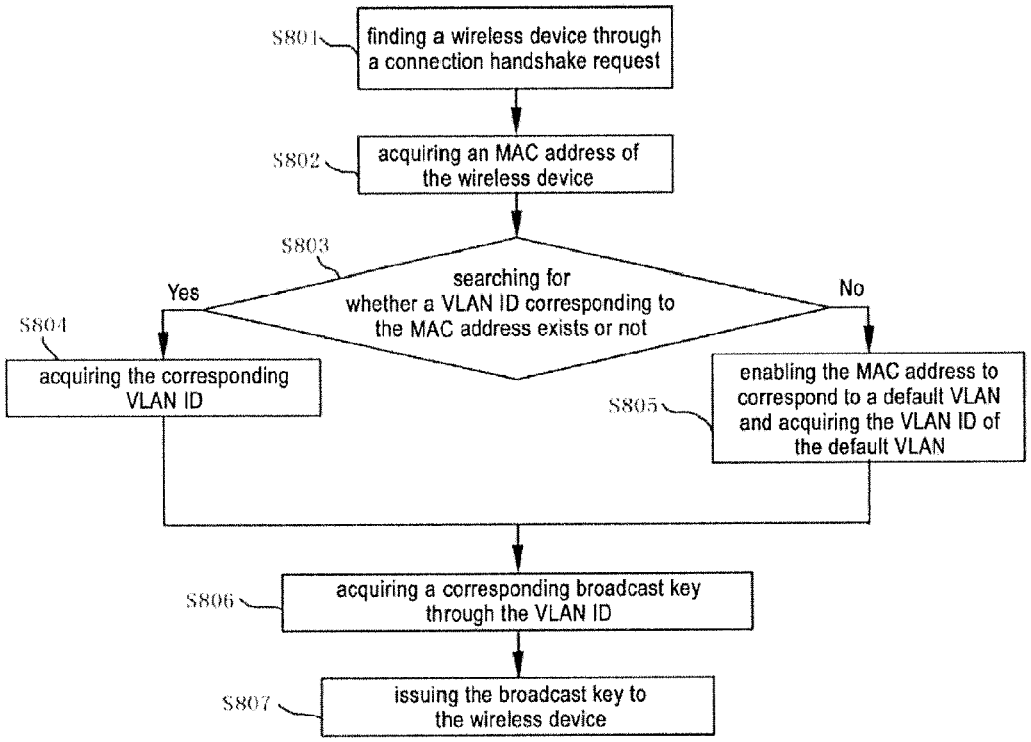
FIG. 8 is a sub-flow diagram of an example of the step of issuing a broadcast key in FIG. 7.

FIGS. 7 and 8 illustrate a method for broadcasting encrypted information according to the present invention. It should be noted that the flow diagram shown in FIG. 7 is a flow diagram in an overall sense, wherein the step of issuing a broadcast key (S701) may be completed by adding a wireless device to a default VLAN through an access point device when the wireless device accesses a WLAN at the first time, and may also be completed when the wireless device is switched from one VLAN to another VLAN. The access point device may encrypt broadcast information for respective VLANs using different broadcast keys (S702) and broadcast the encrypted information (S703) while adding a newly accessing wireless device to a certain VLAN or switching the VLAN to which the wireless device belongs. After the wireless device obtains the broadcast key of a certain VLAN, the broadcast key can be utilized to obtain the broadcast information of the VLAN.

FIG. 8 is a sub-flow diagram of an example of the step of issuing a broadcast key (S701) in FIG. 7. In FIG. 8, by taking the situation that an access point device AP finds a connection handshake request from a wireless device as an example (it can be seen from FIG. 6 that the connection handshake request is sent when the wireless device requests to access the WLAN at the first time), the step of issuing the broadcast key (S701) in FIG. 7 is described. The access point device AP finds the wireless device through the connection handshake request from the wireless device (S801) and acquires a wireless device ID of the wireless device (S802). In the example shown in FIG. 8, the wireless device ID is an MAC address of the wireless device. Next, the access point device AP searches for whether a VLAN ID corresponding to the wireless device ID exists or not (S803). If the VLAN ID corresponding to the wireless device ID exists (Yes in S803), the VLAN ID is acquired (S804). In another aspect, if the VLAN ID corresponding to the wireless device ID does not exist (No in S803), the wireless device is added to a default VLAN and the VLAN ID of the default VLAN is acquired (S805). Thus, in step S804 or S805, the VLAN ID of the VLAN to which the wireless device belongs is acquired through the wireless device ID. Next, the access point device AP acquires the corresponding broadcast key through the acquired VLAN ID (S806) and issues the acquired broadcast key to the wireless device (S807).

Figure 9:
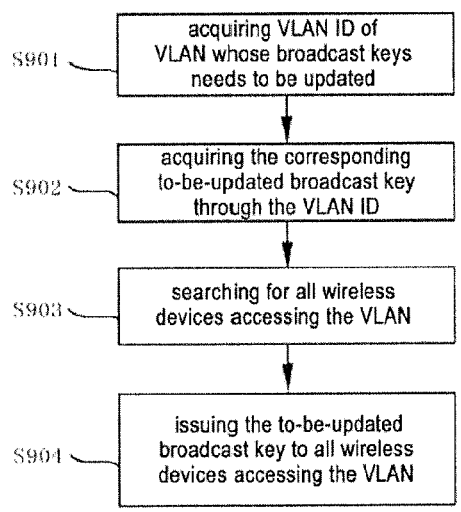
FIG. 9 is a flow diagram of a method for updating broadcast keys according to an embodiment of the present invention.

FIG. 9 is a flow diagram of a method for updating broadcast keys according to an embodiment of the present invention. In the flow diagram shown in FIG. 9, a VLAN ID of a VLAN whose broadcast key needs to be updated is firstly acquired (S901). The updating of the broadcast key of the VLAN may be periodically performed by the access point device AP, be caused by the leaving of a wireless device from the ESS to which the VLAN belongs, or the leaving of a wireless device accessing the VLAN from the VLAN. After the VLAN ID is acquired, the corresponding to-be-updated broadcast key may be acquired through the VLAN ID (S902). The step of acquiring the to-be-updated broadcast key corresponding to the VLAN ID (S902) may be similar to the step of acquiring the broadcast key in the above FIG. 8 (S806). All wireless devices accessing the VLAN are searched (S903), and then the acquired to-be-updated broadcast key is issued to all wireless devices accessing the VLAN (S904).

Figure 10:
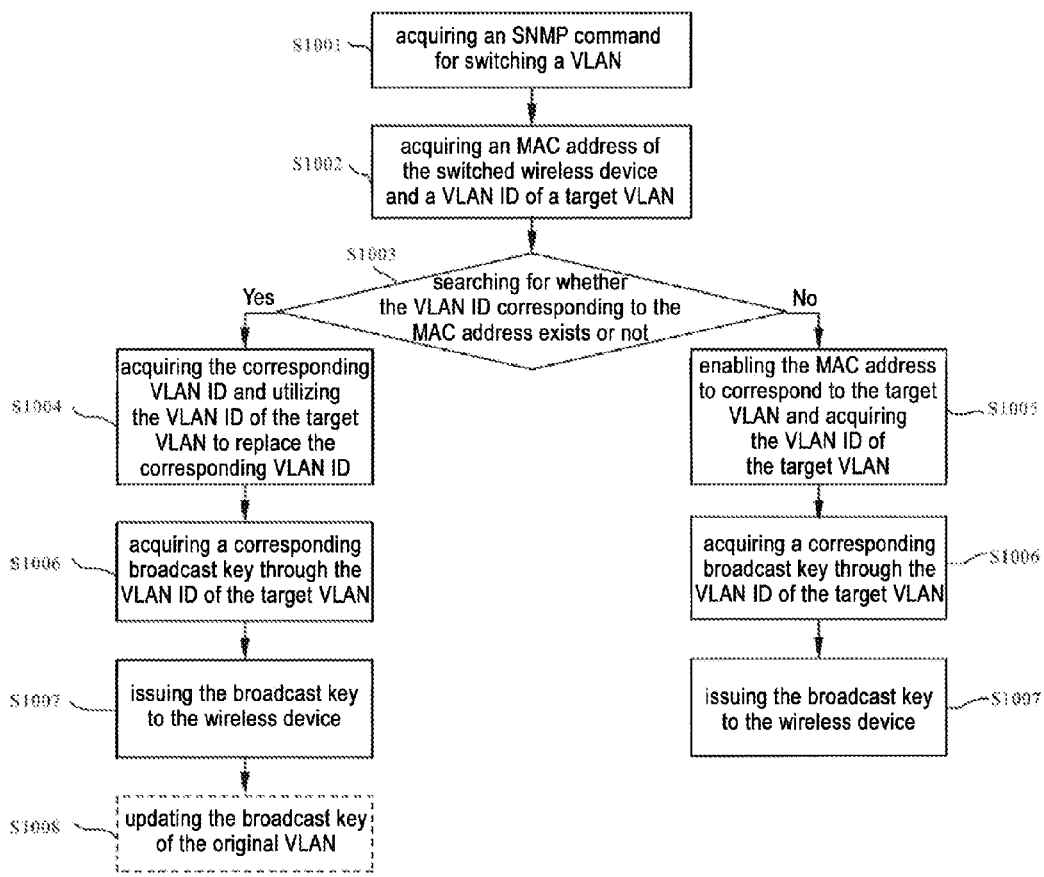
FIG. 10 is a flow diagram of realizing dynamic VLANs according to an embodiment of the present invention.

According to the present invention, dynamic control for the VLANs may be realized, and FIG. 10 is a flow diagram of realizing dynamic VLANs according to an embodiment of the present invention. In the example shown in FIG. 10, the access point device AP is controlled, for example, through SNMP to switch the VLAN of a wireless device being connected to the access point device AP. During the switching process, the wireless device connected to the access point device AP may not realize that it has been switched from one VLAN to another VLAN, and its connection with the access point device AP does not need to be disconnected during the switching process (that is, the original connection does not need to be disconnected). Therefore, access control which is similar to that in a wired VLAN environment is realized in a wireless VLAN environment.

In the example shown in FIG. 10, the access point device AP firstly obtains an SNMP command for VLAN switching (S1001). A wireless device ID of a wireless device which needs to perform VLAN switching and a VLAN ID of a target VLAN are parsed from the obtained SNMP command (S1002). In the example shown in FIG. 10, the wireless device ID is an MAC address of the wireless device. Next, the access point device AP searches for whether the VLAN ID corresponding to the wireless device ID exists or not (S1003). If the VLAN ID corresponding to the wireless device ID exists (Yes in S1003), the VLAN ID of the target VLAN is used to replace the VLAN ID corresponding to the wireless device ID, enabling the VLAN ID of the target VLAN to correspond to the wireless device ID (S1004). In another aspect, if the VLAN ID corresponding to the wireless device ID does not exist (No in S1003), the wireless device which needs to perform VLAN switching is added to the target VLAN, enabling the VLAN ID of the target VLAN to correspond to the wireless device ID (S1005). Next, the access point device AP acquires the corresponding broadcast key through the VLAN ID of the target VLAN (S1006) and issues the acquired broadcast key to the wireless device which needs to perform the VLAN switching (S1007). If the VLAN ID corresponding to the wireless device ID is found in step S1003 (Yes in S1003), after the switching of the VLAN of the wireless device is completed, the broadcast key of the original VLAN should be updated (S1008). The step of updating the broadcast key of the VLAN may refer to the flow diagram shown in FIG. 9. As described above, the updating of the broadcast key of the original VLAN (S1008) is a configurable option for the user. Under certain occasions, the user thinks that it doesn't matter even if the broadcast key is leaked, and the broadcast key does not need to be updated. For example, the default VLAN in the WLAN is a network which can be accessed by any wireless device, and even if its broadcast key is leaked, the safety may not be affected.

The present invention is not limited to the above embodiments and includes various modifications and/or variations without departing from the spirit and the scope of the present invention. Although the embodiments of the present invention have been described above, it should be understood that the embodiments are only the examples of the present invention instead of limitations. Additions, omissions, substitutions and other changes may be made without departing from the scope of the present invention. Therefore, the present invention is not defined by the above description but is defined by the scope of the claims only.

The invention claimed is:

1. An access point device for a wireless local area network the network comprising a plurality of wireless devices and the access point device, wherein on the access point device:
a same extended service set (ESS) is divided into a plurality of virtual local area networks (VLANs), wherein broadcast keys are stored in a broadcast key storage device of the access point device so as to correspond to virtual local area network identifiers (VLAN IDs) of the VLANs by being indexed through the VLAN IDs so as to realize information isolation among the VLANs, and the access point device comprises memory and a processor, the processor executing the following steps:
issuing a corresponding broadcast key, which includes the following sub-steps:
acquiring a wireless device ID of a wireless device accessing the wireless local area network;
acquiring a VLAN ID of a VLAN to which the wireless device belongs through the acquired wireless device ID,
acquiring the corresponding broadcast key through the acquired VLAN ID, and issuing the acquired corresponding broadcast key to the wireless device;
encrypting information, in which the broadcast key corresponding to the VLAN ID of the VLAN is utilized to encrypt information broadcast to the VLAN; and
broadcasting the encrypted information, wherein when the wireless device accessing the ESS leaves the ESS, the processor executes the following steps for the VLAN to which the wireless device belongs:
acquiring the VLAN ID of the VLAN whose broadcast keys needs to be updated;
acquiring the corresponding to-be-updated broadcast key through the acquired VLAN ID, and
updating the acquired corresponding to-be-updated broadcast key, and
issuing an updated broadcast key to all wireless devices accessing the VLAN and then broadcasting encrypted information utilizing the updated broadcast key.

2. The access point device according to claim 1, the processor further executes the following step:
managing wireless devices accessing the ESS.

3. The access point device according to claim 2, the processor further executes the following step:
managing the wireless devices by enabling wireless device identifiers (IDs) of the wireless devices to correspond to VLAN IDs of VLANs to which the wireless devices belong.

4. The access point device according to claim 3, wherein the wireless device IDs of the wireless devices are media access control addresses of the wireless devices.

5. The access point device according to claim 1, wherein the access point device communicates with an authentication system, and information about which VLANs the wireless devices accessing the ESS belong to is acquired from the authentication system.

6. The access point device according to claim 1, the processor further executes the following step:
periodically updating the broadcast keys and storing the updated broadcast keys in the broadcast key storage device so as to correspond to the VLAN IDs of the VLANs.

7. The access point device according to claim 1, wherein after a wireless device accessing the ESS is switched between VLANs divided corresponding to the ESS, the processor further executes the following step:
updating a broadcast key of a VLAN to which the wireless device originally belongs, and storing the updated broadcast key in the broadcast key storage device so as to correspond to VLAN ID of the VLAN.

8. A method for broadcasting encrypted information in a wireless local area network, the network comprising a plurality of wireless devices and an access point device, wherein
on the access point device of the wireless local area network, a same extended service set (ESS) is divided into a plurality of virtual local area networks (VLANs}, wherein broadcast keys are stored in a broadcast key storage device of the access point device so as to correspond to virtual local area network identifiers (VLAN IDs) of the VLANs by being indexed through the VLAN IDs so as to realize information isolation among the VLANs, and the method includes the following steps:
issuing a corresponding broadcast key, which includes the following sub-steps:
acquiring a wireless device identifier (ID) of a wireless device accessing the wireless local area network;
acquiring a virtual local area network identifier (VLAN ID) of a virtual local area network (VLAN) to which the wireless device belongs through the acquired wireless device ID;
acquiring the corresponding broadcast key through the acquired VLAN ID; and
issuing the acquired corresponding broadcast key to the wireless device;
encrypting information, in which the broadcast key corresponding to the VLAN ID of the VLAN is utilized to encrypt information broadcast to the VLAN; and
wherein when the wireless device accessing the ESS leaves the ESS, the access point device executes the following steps for the VLAN to which the wireless device belongs:
acquiring the VLAN ID of a VLAN whose broadcast keys need to be updated;
acquiring the corresponding to-be-updated broadcast key through the acquired VLAN ID; and
updating the acquired corresponding to-be-updated broadcast key and
issuing an updated broadcast key to all wireless devices accessing the VLAN and then broadcasting encrypted information utilizing the updated broadcast key.

9. A method for updating broadcast keys in a wireless local area network, the network comprising a plurality of wireless devices and an access point device, wherein
on the access point device of the wireless local area network, a same extended service set (ESS) is divided into a plurality of virtual local area networks (VLANs), wherein broadcast keys are stored in a broadcast key storage device of the access point device so as to correspond to virtual local area network identifiers (VLAN IDs) of the VLANs by being indexed through the VLAN IDs so as to realize information isolation among the VLANs, and wherein the access point device periodically executes the following steps for the VLANs:

acquiring a VLAN ID of a virtual local area network (VLAN) whose broadcast keys need to be updated;

acquiring a corresponding to-be-updated broadcast key through the acquired VLAN ID; and updating the acquired corresponding to-be-updated broadcast key and issuing an updated broadcast key to all wireless devices accessing the VLAN and then broadcasting encrypted information utilizing the updated broadcast key, wherein when a wireless device accessing the ESS leaves the ESS, the access point device executes the following steps for a VLAN to which the wireless device originally belongs:

acquiring a VLAN ID of the VLAN to which the wireless device originally belongs;

acquiring the corresponding to-be-updated broadcast key through the acquired VLAN ID; and updating the acquired corresponding to-be-updated broadcast key acquired through the acquired VLAN ID and issuing an updated broadcast key to all wireless devices accessing the VLAN and then broadcasting encrypted information utilizing the updated broadcast key.

10. The method for updating broadcast keys in a wireless local area network of claim 9, after a wireless device accessing the ESS is switched between the VLANs divided from the ESS the access point device further executes the following steps for a VLAN to which the wireless device originally belongs:

acquiring a VLAN ID of the VLAN to which the wireless device originally belongs;

acquiring a corresponding to-be-updated broadcast key through the acquired VLAN ID; and updating the acquired corresponding to-be-updated broadcast key and issuing an updated broadcast key to all wireless devices accessing the VLAN and then broadcasting encrypted information utilizing the updated broadcast key.

* * * * *